United States Patent
Qureshi (10) Patent No.: US 8,627,008 B2
(45) Date of Patent: Jan. 7, 2014

(54) MEMORY ACCESS PREDICTION (75) Inventor: Moinuddin Khalil Ahmed Qureshi, White Plains, NY (US)

(73) Assignee: International Business Machines Corporation, Armonk, NY (US)

(*) Notice: Subject to any disclaimer, the term of this patent is extended or adjusted under 35 U.S.C. 154(b) by 886 days.

(21) Appl. No.: 12/700,043

(22) Filed: Feb. 4, 2010

(65) Prior Publication Data

US 2011/0191546 A1 Aug. 4, 2011

(51) Int. Cl.
*G06F 12/08* (2006.01)
*G06F 12/00* (2006.01)

(52) U.S. Cl.
USPC .... 711/121; 711/144; 711/146; 711/E12.033; 711/E12.041

(58) Field of Classification Search
None
See application file for complete search history.

(56) References Cited

U.S. PATENT DOCUMENTS

| | | | |
|---|---|---|---|
| 5,761,715 A | 6/1998 | Takahashi | |
| 5,875,468 A | 2/1999 | Erlichson | |
| 6,557,080 B1* | 4/2003 | Burger et al. | 711/137 |
| 6,571,315 B2 | 5/2003 | Campbell | |
| 7,206,902 B2 | 4/2007 | Hakura et al. | |
| 7,243,195 B2 | 7/2007 | O'Brien et al. | |
| 7,266,642 B2 | 9/2007 | Shen et al. | |
| 7,308,538 B2 | 12/2007 | Shen | |
| 7,360,032 B2 | 4/2008 | Cantin et al. | |
| 7,363,435 B1 | 4/2008 | Stenstrom | |
| 7,437,517 B2 | 10/2008 | da Silva et al. | |
| 2009/0024835 A1* | 1/2009 | Fertig et al. | 712/207 |

\* cited by examiner

*Primary Examiner* — Reginald Bragdon
*Assistant Examiner* — Eric Loonan
(74) *Attorney, Agent, or Firm* — Law Offices of Ira D. Blecker, P.C.

(57) ABSTRACT

An apparatus for memory access prediction which includes a plurality of processors, a plurality of memory caches associated with the processors, a plurality of saturation counters associated with the processors, each of the saturation counters having an indicator bit, and a physical memory shared with the processors, saturation counters and memory caches. Upon a cache miss for a data item, a cache snoop and access to physical memory are initiated in parallel for the data item if the indicator bit is a first predetermined bit (one (1) or zero (0)) whereas a cache snoop is initiated if the most significant bit is a second predetermined bit (zero (0) or one (1)).

20 Claims, 4 Drawing Sheets

| | | BITS | | | VALUE |
|---|---|---|---|---|---|
| 0 | 0 | 0 | 0 | 0 | 0 |
| 0 | 0 | 0 | 0 | 1 | 1 |
| 0 | 0 | 0 | 1 | 0 | 2 |
| 0 | 0 | 0 | 1 | 1 | 3 |
| 0 | 0 | 1 | 0 | 0 | 4 |
| 0 | 0 | 1 | 0 | 1 | 5 |
| . | . | . | . | . | . |
| . | . | . | . | . | . |
| . | . | . | . | . | . |
| 0 | 1 | 0 | 1 | 0 | 10 |
| 0 | 1 | 0 | 1 | 1 | 11 |
| 0 | 1 | 1 | 0 | 0 | 12 |
| 0 | 1 | 1 | 0 | 1 | 13 |
| 0 | 1 | 1 | 1 | 0 | 14 |
| 0 | 1 | 1 | 1 | 1 | 15 |

MEMORY ACCESS PREDICTION

BACKGROUND OF THE INVENTION

The present invention relates to multiprocessor systems having caches and physical memory and, more particularly, relates to prediction in a multiprocessor system of whether a data item responsive to a cache miss can be found in cache or physical memory.

In a multiprocessor system, when there is a cache miss in one of the processors, the data item may be available in the cache of another processor. If the data item is not available in any of the other processors, then memory is accessed and the data item is obtained from memory.

On a cache miss in one of the processors, it would be desirable to get the data item with the lowest latency while keeping the number of memory accesses as low as possible. Reduced latency increases processor performance, whereas, reducing memory accesses reduces the contention for off-chip bandwidth and or ports in the memory banks, and also reduces power consumption in the memory system. However, the two objectives of reduced memory latency and fewer memory accesses may contradict each other. Current processors typically employ a LateAccess policy, which waits for a cache snoop response from other processors before accessing memory. If the data item is not present in the multiprocessor system, then memory is accessed. This policy avoids extraneous memory fetches albeit at increased latency for memory accesses. Processors can also employ an EarlyAccess policy which reduces memory latency by accessing memory in parallel with snooping the other processors. If the data item is already present in other processors, then the data item obtained from memory is discarded. These extraneous fetches from memory cause contention in the memory system and increase power consumption.

BRIEF SUMMARY OF THE INVENTION

It would be desirable to have an EarlyAccess policy for data items likely to be present in memory and a LateAccess policy for data items likely to be present in the processors. To this end, the present inventor presents a prediction mechanism that predicts when the processors should use LateAccess policy and when the processors should use EarlyAccess policy to fetch a data item responsive to a cache miss.

The various advantages and purposes of the present invention as described above and hereafter are achieved by providing, according to a first aspect of the invention, an apparatus for memory access prediction which includes a plurality of processors, a plurality of memory caches associated with the processors, a physical memory, and a plurality of saturation counters associated with the processors, each of the saturation counters having an indicator bit for predicting whether a data item may be found by a cache snoop or by accessing physical memory in parallel with a cache snoop. Upon a cache miss for a data item, a cache snoop and access to the physical memory are initiated in parallel for the data item if the indicator bit is a first predetermined bit (one (1) or zero (0)) whereas a cache snoop is initiated if the most significant bit is a second predetermined bit (zero (0) or one (1)).

According to a second aspect of the invention, there is provided an apparatus for memory access prediction which includes a cluster which further includes a plurality of processors, a plurality of memory caches associated with the processors, a physical memory, and a plurality of saturation counters associated with the processors, each of the saturation counters having an indicator bit for predicting whether a data item may be found by a cache snoop or by accessing physical memory in parallel with a cache snoop. Upon a cache miss for a data item, a cache snoop and access to the physical memory are initiated in parallel for the data item if the indicator bit is a first predetermined bit (one (1) or zero (0)) whereas a cache snoop is initiated if the most significant bit is a second predetermined bit (zero (0) or one (1)).

According to a third aspect of the invention, there is provided a method for memory access prediction in multiprocessors including a plurality of processors, a plurality of memory caches associated with the processors, a plurality of saturation counters associated with the processors, and a physical memory shared with the processors, saturation counters and memory caches. The method includes the steps of, responsive to a cache miss for a data item, consulting by a computer processor a saturation counter to predict whether a data item will be fetched from a cache of a processor or physical memory wherein the saturation counter keeps track of data items actually obtained in a previous cache miss from a cache of a processor of the plurality of processors or from physical memory and the saturation counter has an indicator bit such that if the indicator bit in the saturation counter is a first predetermined bit (one (1) or zero (0)), a cache snoop and access to physical memory in parallel is predicted for the data item and if the indicator bit is a second predetermined bit (zero (0) or one (1)), a cache snoop is predicted for the data item, and initiating by a computer processor a cache snoop and access to physical memory in parallel for the data item if the indicator bit is the first predetermined bit or initiating by a computer processor a cache snoop if the indicator bit is the second predetermined bit.

According to a fourth aspect of the invention, there is provided a computer program product for memory access prediction in multiprocessors comprising a plurality of processors, a plurality of memory caches associated with the processors, a plurality of saturation counters associated with the processors, and a physical memory shared with the processors, saturation counters and memory caches, and including a computer readable storage medium having computer readable program code embodied therewith, the computer readable program code which further includes, responsive to a cache miss for a data item, computer readable program code configured to consult a saturation counter to predict whether a data item may be fetched from a cache or physical memory wherein the saturation counter keeps track of data items actually obtained in a previous cache miss from a cache of a processor or from physical memory and the saturation counter has an indicator bit such that if the indicator bit in the saturation counter is a first predetermined number, a cache snoop and access to physical memory in parallel is predicted for the data item and if the indicator bit is a second predetermined number, a cache snoop is predicted for the data item, and computer readable program code configured to initiate a cache snoop and access to physical memory in parallel for the data item if the indicator bit is the first predetermined bit or to initiate a cache snoop if the indicator bit is the second predetermined bit.

BRIEF DESCRIPTION OF THE DRAWINGS

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

Figure 1:
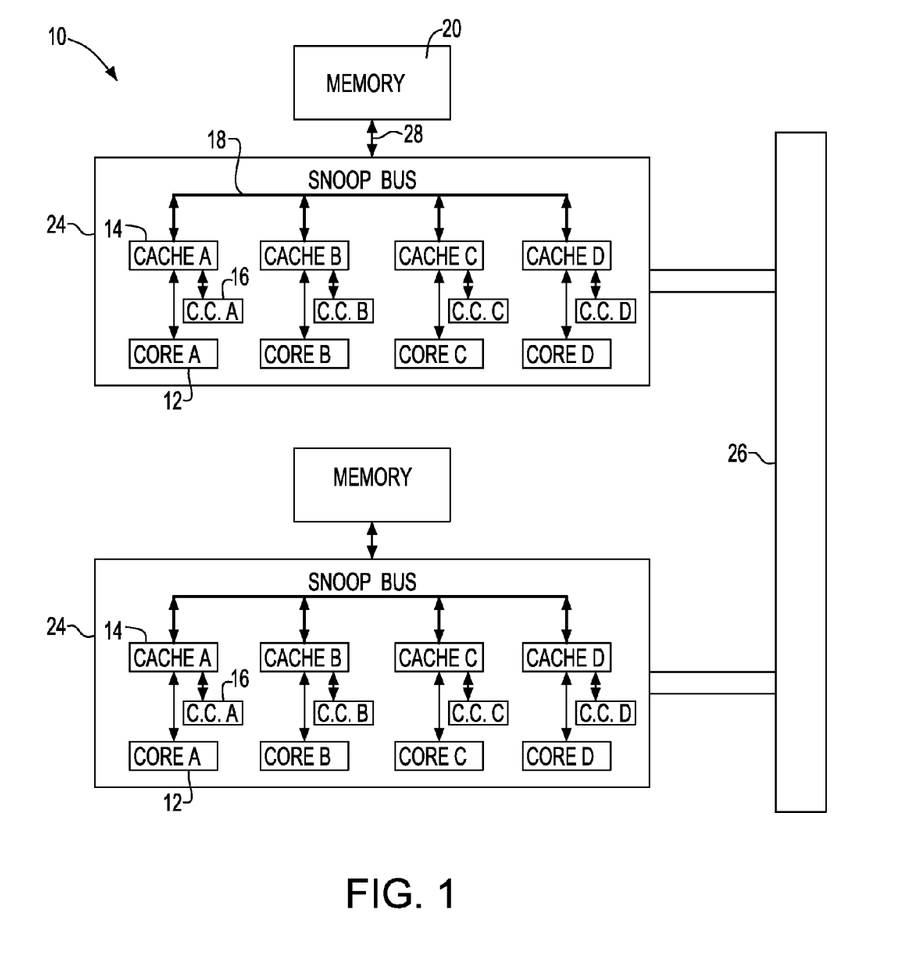
FIG. 1 is a block diagram of a multiprocessor system according to the present invention.

Referring to the Figures in more detail, and particularly referring to FIG. 1, there is shown a chip multiprocessor (CMP) system 10 having a plurality of processors or cores 12, each with a private cache 14. Processor and core may be used interchangeably throughout the discussion of the present invention. Connecting caches 14 is a snoop bus 18 which is used to maintain cache coherence. A shared memory (e.g., RAM) 20, also called physical memory, is coupled to the processors 12 and caches 14 by a bus 28. Each cache 14 has a cache controller 16 to handle movement of cache lines between the cache and memory for cache misses. The group of processors 12, caches 14, cache controllers, 16, snoop bus 18, bus 28 and memory 20 constitute a cluster 24. There may be one or a plurality of such clusters 24 connected by a high speed bus 26 to make up the CMP. Other features inherent in a CMP system are not shown as they are not relevant to the present invention. While there are four processors and caches shown in cluster 24 in FIG. 1, there may be more or less than four processors and caches depending on the computer architecture.

For purposes of illustration and not limitation, the Figures and the discussion use a CMP system to describe the various embodiments of the present invention. However, the present invention is applicable to any multiprocessor organization, such as CMP or SMP (Symmetric Multiprocessing system), using snoopy protocols to maintain cache coherence.

The problem addressed by the current invention can be framed in the following manner. If a memory request for a data item from core A does not find the data item in cache A, there is a cache miss which is broadcast to all the other caches (B, C, and D in FIG. 1) in the CMP system 10. If one of the other caches (B, C, and D in FIG. 1) in the system has a copy of the requested data item, the corresponding cache line is sent to cache A, and the data item requested is sent to core A. Cache line and data item may be used interchangeably herein. If the requested data item is not present in any of the caches, the corresponding cache line is fetched from memory 20 (in FIG. 1), and installed in cache A, and core A's request is satisfied. If it is possible to predict whether the data item may be found in the caches in cluster 24 or in memory 20, reduced latency while keeping the number of memory accesses as low as possible may be advantageously achieved.

In one preferred embodiment of the present invention, a saturation counter is associated with each processor 12 in the cluster 24. In one preferred embodiment, the saturation counter is located in the cache controller 16.

Figure 2:
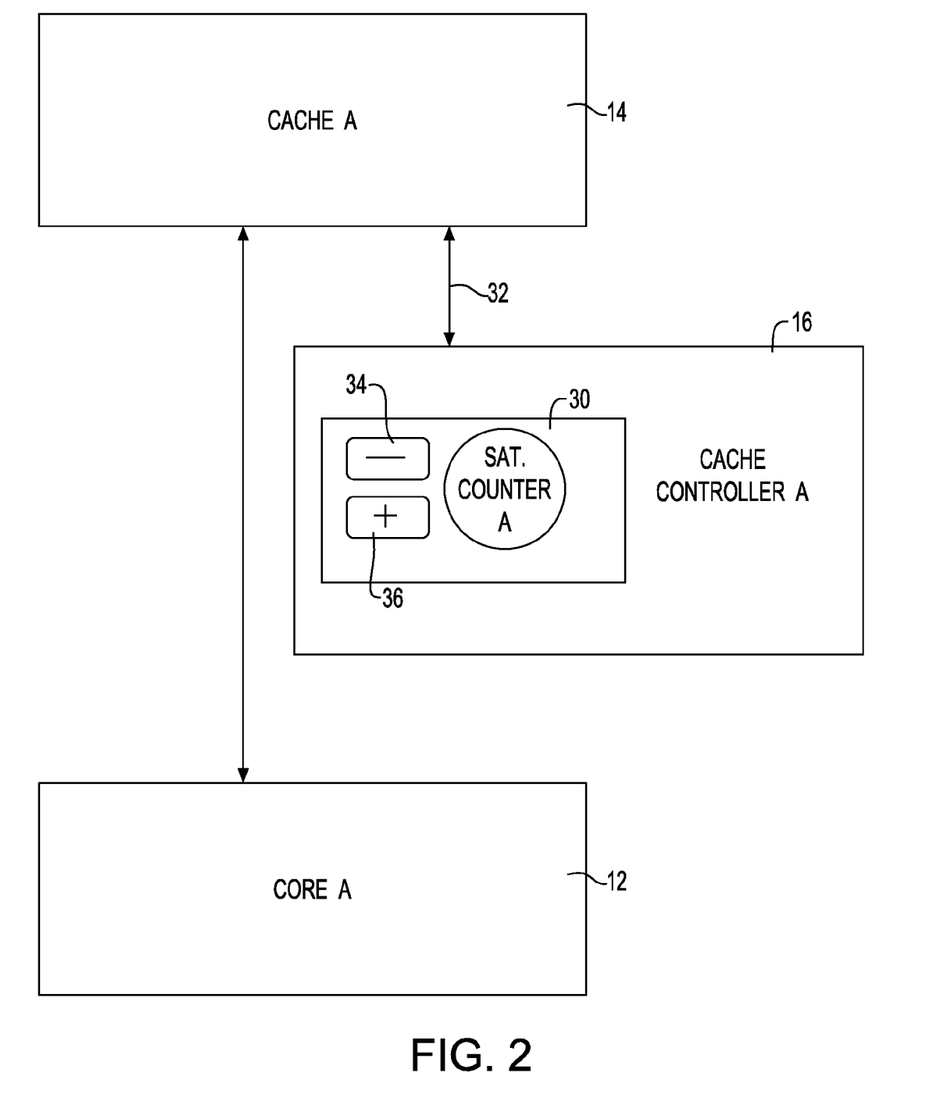
FIG. 2 is a block diagram of a portion of a multiprocessor system showing a saturation counter as used in the present invention.

Referring now to FIG. 2, a portion of cluster 24 is shown in greater detail. Cache controller 16 is connected by a data bus 32 to cache 14. Located within cache controller 16 is saturation counter 30. The location of saturation counter 30 is preferably within cache controller 16 but its location is a matter of design and may be located in other portions of cluster 24. Each processor 12 and cache 14 may have a saturation counter 30 associated with it. The saturation counter 30 keeps track of whether past cache misses have been serviced by cache 14 from other processors 12 or by memory 20.

A saturation counter has a maximum value and a minimum value. When the saturation counter reaches its maximum value, incrementing the saturation counter will not change the maximum value and when the saturation counter reaches its minimum value, decrementing the saturation counter will not change the minimum value.

Figure 3:
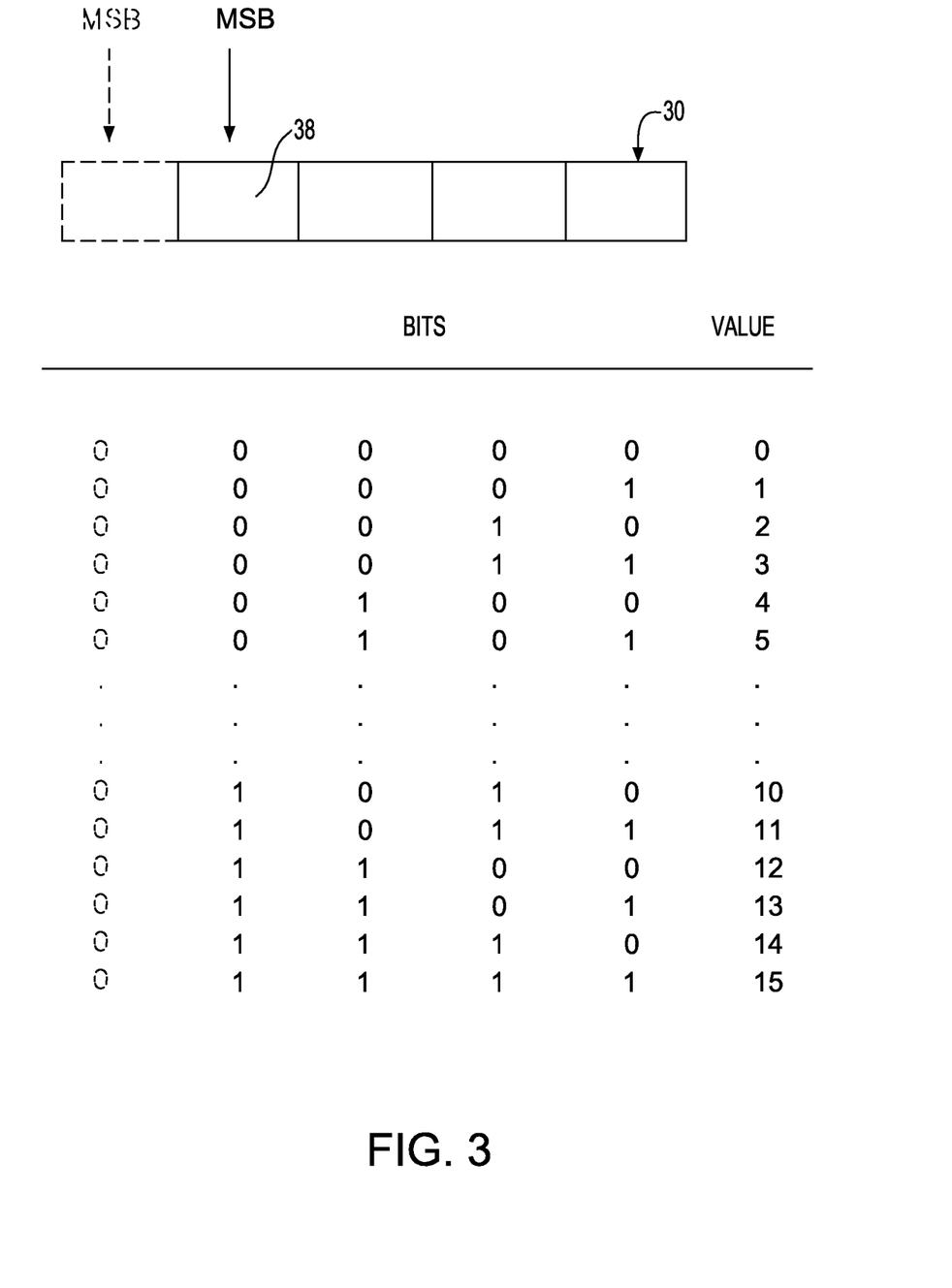
FIG. 3 is a representation of a 4-bit and 5-bit saturation counter.

Referring now to FIG. 3, there is shown an exemplary embodiment of the saturation counter 30. For purposes of illustration and not limitation, saturation counter 30 is a 4-bit counter having a minimum value of zero (0) and a maximum value of fifteen (15). In general, the saturation counter may have 4 or 5 bits although saturation counters having fewer or greater numbers of bits are within the scope of the present invention. Saturation counter 30 also has a "most significant bit" (MSB) which is defined as the farthest left bit 38 as indicated in FIG. 3. For the 4-bit saturation counter 30 shown in FIG. 3, for values of zero (0) to 7 the MSB will be zero (0) while for values of eight (8) to fifteen (15) the MSB will be one (1). For a 5-bit saturation counter 30, the fifth bit, which is also the MSB of the 5-bit saturation counter 30, is shown in phantom.

Referring now also to FIG. 2, when there is a cache miss in a given processor, for example core A, and the cache line (data item) is obtained from other processors in the system, then the saturation counter 30 for core A is decremented, as indicated by negative sign 34 in saturation counter 30. If the cache line (data item) is obtained from physical memory 20, then the saturation counter 30 for core A is incremented, as indicated by positive sign 36 in saturation counter 30. An indicator bit in saturation counter 30 may be used to predict EarlyAccess or LateAccess policy. It is most preferred that the indicator bit is the MSB for both the 4-bit and 5-bit saturation counters. Thus, if the indicator bit of the saturation counter 30 for core A is 1, then most of the cache misses of core A were serviced by memory and hence an EarlyAccess policy is predicted for future memory requests. If the indicator bit of the saturation counter 30 for core A is 0, then most misses of core A were satisfied by other processors in cluster 24, and hence a LateAccess policy is predicted for future memory requests. Therefore, if the indicator bit of the saturation counter 30 for core A is one (1), core A is predicted to use an EarlyAccess policy while if the indicator bit of the saturation counter 30 for core A is zero (0), core A is predicted to use a LateAccess policy. The decision of whether an EarlyAccess policy or LateAccess policy should be used is determined for each processor independently using a saturation counter for each processor.

In a further embodiment of the present invention, the function of the indicator bit could be reversed such that when a cache miss is serviced by other processors in the system, the saturation counter 30 for the core requesting the information is incremented while if the cache miss is serviced by memory 20, then the saturation counter 30 for the core requesting the information is decremented. It follows then that if the indicator bit of the saturation counter 30 for core A is zero (0) in this embodiment, core A is predicted to use an EarlyAccess policy for future memory requests while if the indicator bit of the saturation counter 30 for core A is one (1), core A is predicted to use a LateAccess policy for future memory requests.

In a further embodiment of the present invention, each cache controller 16 in cluster 24 may include more than one saturation counter 30. For example, in one preferred embodiment, there may be two saturation counters 30 for each cache controller 16 in cluster 24. In operation, one saturation counter 30 may predict EarlyAccess or LateAccess policy for cache lines (data items) have an odd address while another saturation counter 30 may predict EarlyAccess or LateAccess policy for cache lines (data items) have an even address.

Figure 4:
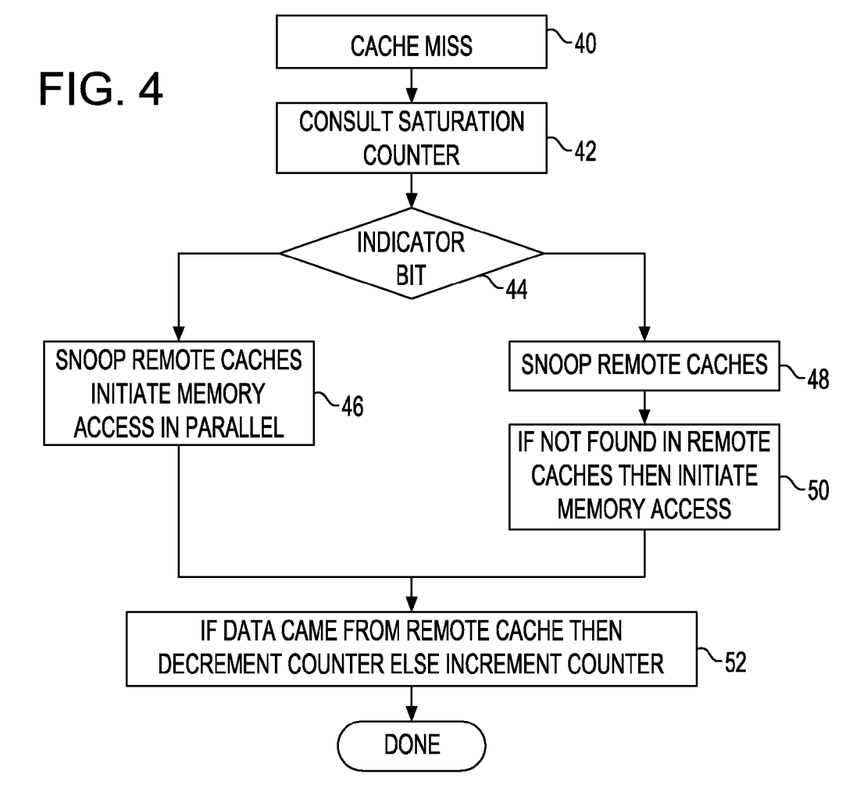
FIG. 4 is a flow chart illustrating an implementation of the method of the present invention.

The method of the present invention may be illustrated by the flow chart in FIG. 4. In block 40, there is a cache miss for a data item. In block 42, the cache controller consults a saturation counter to predict whether the data item may be found in a cache of another processor in the cluster or in physical memory. The saturation counter keeps track of where data items were actually obtained in previous cache misses, that is, from a cache of a processor in the cluster or from physical memory. The saturation counter has an indicator bit which preferably is the most significant bit in the saturation counter. It is most preferred that the saturation counter be a 4-bit or 5-bit saturation counter. In block 44, the cache controller keeps track of the indicator bit of the saturation counter based on past cache misses. If the indicator bit is a first predetermined number (1 if the saturation counter is incremented for data items fetched from memory or 0 if the saturation counter is decremented for data items fetched from memory), then accessing physical memory in parallel with a cache snoop (EarlyAccess policy) is predicted for the data item. If the indicator bit is a second predetermined number (0 if the saturation counter is decremented for data items fetched from cache or 1 if the saturation counter is incremented for data items fetched from cache), then first access to a cache snoop (LateAccess policy) is predicted to be performed for the data item. In block 44, a cache controller may determine that the indicator bit predicts an EarlyAccess policy so then in block 46, a cache controller initiates accessing physical memory and cache snooping in parallel. Then, in block 52, the cache controller increments or decrements according to whether the data item was found in another cache in the cluster or in memory. That is, in one embodiment of the present invention, the saturation counter decrements for data items fetched from another cache in the cluster and increments for data items fetched from memory. In another embodiment of the present invention, the saturation counter increments for data items fetched from another cache in the cluster and decrements for data items fetched from memory. The important point is that the saturation counter keeps track of where previous data items have been fetched. FIG. 4 illustrates one embodiment of the present invention wherein the cache controller decrements the saturation counter for data items fetched from another cache in the cluster and increments the saturation counter for data items fetched from memory.

Returning to block 44, a cache controller may determine that the indicator bit predicts that the data item may be fetched by performing a cache snoop (LateAccess policy) so then in block 48, a cache controller initiates a cache snoop to fetch the data item from a cache of another processor in the cluster. It may happen that the data item is not actually in another cache in the cluster so in that case, in block 50, the data item is fetched from physical memory by the cache controller. Thereafter, in block 52, the cache controller decrements or increments according to whether the data item is found in another cache in the cluster or in memory as discussed above. Again, FIG. 4 illustrates one embodiment of the present invention wherein the cache controller decrements the saturation counter for data items fetched from another cache in the cluster and increments the saturation counter for data items fetched from memory.

Figure 5:
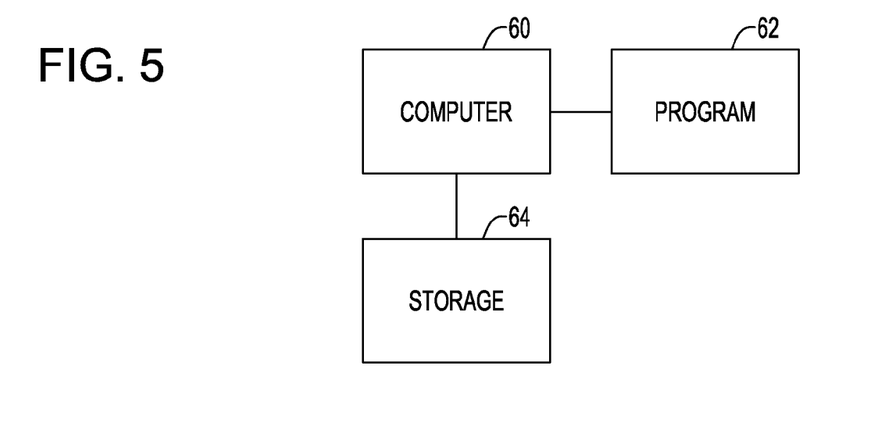
FIG. 5 is a block diagram illustrating an exemplary hardware environment of the present invention.

FIG. 5 is a block diagram that illustrates an exemplary hardware environment of the present invention. The present invention is typically implemented using a computer 60 comprised of microprocessor means, random access memory (RAM), read-only memory (ROM) and other components. The computer may be a personal computer, mainframe computer or other computing device. Resident in the computer 60, or peripheral to it, will be a storage device 64 of some type such as a hard disk drive, floppy disk drive, CD-ROM drive, tape drive or other storage device.

Generally speaking, the software implementation of the present invention, program 62 in FIG. 5, is tangibly embodied in a computer-readable medium such as one of the storage devices 64 mentioned above. The program 62 comprises instructions which, when read and executed by the microprocessor of the computer 60 causes the computer 60 to perform the steps necessary to execute the steps or elements of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above in with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

I claim:

1. An apparatus for memory access prediction comprising:
   a plurality of processors;
   a plurality of private memory caches associated with the processors such that there is at least one private memory cache associated with each processor;
   a physical memory; and
   a plurality of saturation counters associated with the processors such that there is at least one saturation counter associated with each processor, each of the saturation counters having an indicator bit for predicting whether a data item may be found by just a cache snoop or by accessing the physical memory in parallel with the cache snoop;
   wherein responsive to a cache miss in one of the private memory caches associated with one of the processors for a data item, the cache snoop and access to the physical memory are initiated in parallel for the data item if the indicator bit is a first predetermined value (one (1) or zero (0)) whereas just the cache snoop is initiated if the indicator bit is a second predetermined value (zero (0) or one (1)) wherein the cache snoop is to each of the plurality of private memory caches other than the one of the private memory caches.

2. The apparatus of claim 1 wherein the saturation counters keep track of data items actually obtained from the cache snoop or from the physical memory and wherein the data items actually obtained from the cache snoop cause the saturation counter for the one of the private memory caches in which there is the cache miss to be one of decremented or incremented and the data items actually obtained from the physical memory cause the saturation counter to be an other one of decremented or incremented.

3. The apparatus of claim 1 wherein each of the saturation counters is a counter that has a maximum value and a minimum value and wherein when the saturation counter reaches the maximum value, incrementing the saturation counter will not change the maximum value and when the saturation counter reaches the minimum value, decrementing the saturation counter will not change the minimum value.

4. The apparatus of claim 1 wherein the indicator bit is a most significant bit.

5. The apparatus of claim 1 where there is a plurality of saturation counters physically associated with each processor.

6. The apparatus of claim 1 further comprising a plurality of cache controllers associated with the processors such that there is one cache controller associated with each processor and each of the plurality of cache controllers having a saturation counter located within the cache controller.

7. An apparatus for memory access prediction comprising:
   a cluster comprising:
   a plurality of processors;
   a plurality of private memory caches and cache controllers associated with the processors such that there is one cache controller associated with each processor and at least one private memory cache associated with each processor;
   a physical memory; and
   a plurality of saturation counters associated with the cache controllers such that there is at least one saturation counter located within each cache controller, each of the saturation counters having an indicator bit for predicting whether a data item may be found by just a cache snoop or by accessing physical memory in parallel with the cache snoop;

wherein responsive to a cache miss in one of the private memory caches associated with one of the processors for a data item, the cache snoop and access to the physical memory are initiated in parallel for the data item if the indicator bit is a first predetermined value (one (1) or zero (0)) whereas just the cache snoop is initiated if the indicator bit is a second predetermined value (zero (0) or one (1)) wherein the cache snoop is to each of the plurality of private memory caches other than the one of the private memory caches.

8. The apparatus of claim 7 comprising a plurality of clusters connected by a bus.

9. A method for memory access prediction in multiprocessors comprising a plurality of processors, a plurality of private memory caches associated with the processors such that there is at least one private memory cache associated with each processor, a plurality of saturation counters associated with the processors such that there is at least one saturation counter associated with each processor, and a physical memory shared with the processors, the saturation counters and the private memory caches, the method comprising the steps of:

responsive to a cache miss in one of the private memory caches associated with one of the processors for a data item, consulting by a computer processor a saturation counter for the one of the private memory caches to predict whether the data item may be fetched from a cache snoop to each of the plurality of private memory caches other than the one of the private memory caches or the physical memory wherein the saturation counter keeps track of data items actually obtained in a previous cache miss from the one of the private memory caches by the cache snoop or from the physical memory and the saturation counter has an indicator bit such that when the indicator bit in the saturation counter is a first predetermined value (one (1) or zero (0)), the cache snoop and access to the physical memory in parallel is predicted for the data item and when the indicator bit is a second predetermined value (zero (0) or one (1)), just the cache snoop is predicted for the data item; and initiating by the computer processor the cache snoop and access to the physical memory in parallel for the data item if the indicator bit is the first predetermined value or initiating by the computer processor just the cache snoop if the indicator bit is the second predetermined value.

10. The method of claim 9 wherein if the indicator bit is the second predetermined value, further comprising initiating by the computer processor access to the physical memory when the data item is not in the private memory caches.

11. The method of claim 10 further comprising the step of: decrementing by the computer processor the saturation counter for the one of the private memory caches when the data item is actually obtained from the cache snoop or incrementing by the computer processor the saturation counter for the one of the private memory caches when the data item is actually obtained from the physical memory.

12. The method of claim 10 further comprising the step of: incrementing by the computer processor the saturation counter for the one of the private memory caches when the data item is actually obtained from the cache snoop or decrementing by the computer processor the saturation counter for the one of the private memory caches when the data item is actually obtained from the physical memory.

13. The method of claim 9 wherein the indicator bit is a most significant bit.

14. The method of claim 9 wherein each of the saturation counters is a counter that has a maximum value and a minimum value and wherein when the saturation counter reaches the maximum value, incrementing the saturation counter will not change the maximum value and when the saturation counter reaches the minimum value, decrementing the saturation counter will not change the minimum value.

15. A computer program product for memory access prediction in multiprocessors comprising a plurality of processors, a plurality of private memory caches associated with the processors such that there is at least one private memory cache associated with each processor, a plurality of saturation counters associated with the processors such that there is at least one saturation counter associated with each processor, and a physical memory shared with the processors, the saturation counters and the private memory caches, and comprising:

a non-transitory computer readable storage medium having computer readable program code embodied therewith, the computer readable program code comprising:

responsive to a cache miss in one of the private memory caches associated with one of the processors for a data item, the computer readable program code configured to consult a saturation counter for the one of the private memory caches to predict whether the data item may be fetched only from a cache snoop to each of the plurality of private memory caches other than the one of the private memory caches or the physical memory wherein the saturation counter keeps track of data items actually obtained in a previous cache miss from the one of the private memory caches by the cache snoop or from the physical memory and the saturation counter has an indicator bit such that when the indicator bit in the saturation counter is a first predetermined value, the cache snoop and access to the physical memory in parallel is predicted for the data item and when the indicator bit is a second predetermined value, just the cache snoop is predicted for the data item; and the computer readable program code configured to initiate the cache snoop and access to the physical memory in parallel for the data item when the indicator bit is the first predetermined value or to initiate just the cache snoop when the indicator bit is the second predetermined value.

16. The computer program product of claim 15 wherein when the indicator bit is the second predetermined value, further comprising the computer readable program code configured to initiate access to the physical memory when the data item is not in the private memory caches.

17. The computer program product of claim 16 further comprising:

the computer readable program code configured to decrement the saturation counter for the one of the private memory caches when the data item is actually obtained from the cache snoop or increment the saturation counter for the one of the private memory caches when the data item is actually obtained from the physical memory.

18. The computer program product of claim 16 further comprising:

the computer readable program code configured to increment the saturation counter for the one of the private memory caches when the data item is actually obtained from the cache snoop private memory caches of the plurality of processors or decrement the saturation counter for the one of the private memory caches when the data item is actually obtained from the physical memory.

19. The computer program product of claim 15 wherein the indicator bit is a most significant bit.

20. The computer program product of claim 15 wherein each of the saturation counters is a counter that has a maximum value and a minimum value and wherein when the saturation counter reaches the maximum value, incrementing the saturation counter will not change the maximum value and when the saturation counter reaches the minimum value, decrementing the saturation counter will not change the minimum value.

* * * * *